Dec. 24, 1968 G. D. FENNER 3,418,628
ALIGNMENT DEVICE FOR TRAILER
Filed Aug. 23, 1965
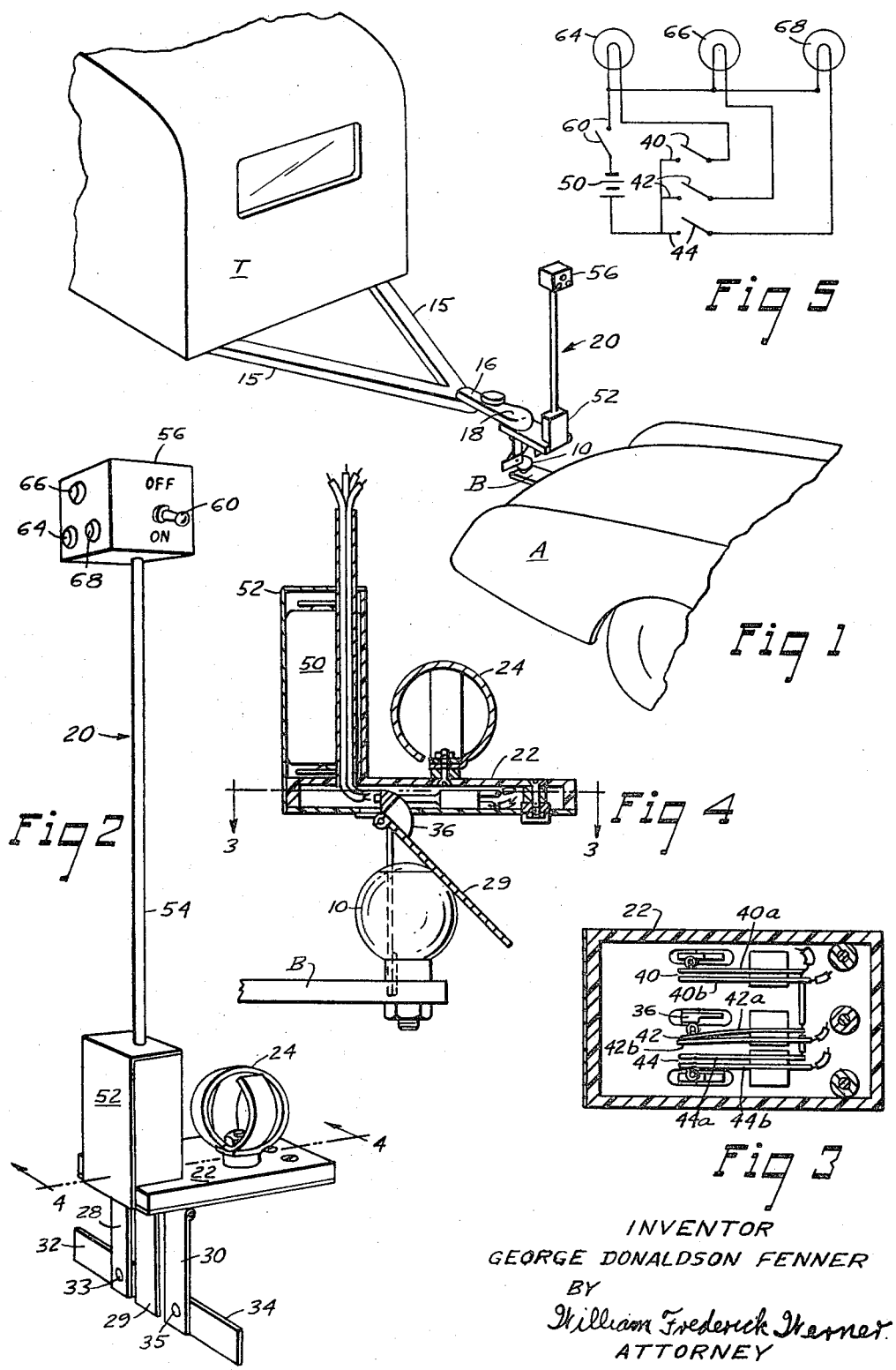
INVENTOR
GEORGE DONALDSON FENNER
BY
William Frederick Werner
ATTORNEY

United States Patent Office

3,418,628
Patented Dec. 24, 1968

3,418,628
ALIGNMENT DEVICE FOR TRAILER
George Donaldson Fenner, 210 Gorton Lake Blvd.,
Warwick, R.I. 02886
Filed Aug. 23, 1965, Ser. No. 481,824
5 Claims. (Cl. 340—52)

ABSTRACT OF THE DISCLOSURE

Alignment device for a trailer hitch having a plurality of pivotally mounted electrical switches actuated by a ball on the motor vehicle hitch to indicate the relative position of the ball and socket portions of a coupling member.

---

This invention relates to guidance devices and more particularly to a portable signal device for guiding a vehicle into proper alignment with a trailer so that the two may be quickly coupled together.

The great difficulty in joining a vehicle and a trailer properly is that a driver while maneuvering his vehicle in his attempt to properly orient the ball of the trailer hitch on the vehicle with relation to the socket of the coupling member on the trailer, can not usually see the ball or socket. Since the trailer is very often too heavy to move about to make up for any misalignments to normal hitching procedures require either the guidance of another person or, if the driver is alone, considerable back and forth maneuvering before the ball and socket are properly aligned.

Attempts have been previously made to deal with this problem either by mechanical guidance means or by electrical guidance means. However, the mechanical means have been overly costly and complex. The prior electrical means have similar disadvantages and further have required a power hookup to the vehicle and a substantially permanent mount on either the vehicle or the trailer.

The present invention overcomes these disadvantages while meeting the following objectives.

An object of the present invention is to substantially eliminate the inconvenience suffered by a lone driver in attempting to back a vehicle into a position where the unseen ball on the vehicle trailer hitch is properly beneath the socket portion of the trailer coupling member.

Another object of the invention is to provide a portable self contained and powered signal unit which may easily be fastened and removed from the trailer coupling member.

Still another object of the present invention is to provide an electrically actuated signal device which visually indicates to a vehicle driver when he is in proper position to hitch a trailer to his vehicle.

The above and other objects will be made apparent by the following description of a preferred embodiment of the invention and the accompanying drawing forming a part hereof, and in which:

FIGURE 1 is a perspective view of a portion of an automobile, and a trailer with the invention attached, showing the two properly oriented and ready to be hitched together.

FIGURE 2 is a perspective elevation view of the invention alone.

FIGURE 3 is a sectioned plan view taken along line 3—3 of FIGURE 4.

FIGURE 4 is a sectioned elevation view taken along line 4—4 of FIGURE 2.

FIGURE 5 is a simplified schematic wiring diagram of the invention.

Referring more particularly to the drawing in FIGURE 1 it is seen that an automobile A having a trailer hitch B is in the process of moving into alignment with trailer T. From trailer T two converging draught bars 15—15 converge to form a coupling member 16 which contains a socket portion 18.

The hitch B has a ball member 10 which is adapted to be contained within the socket portion 18 when the hitch and coupling are joined together.

The invention, signal device, indicated generally as 20, functions to indicate when the ball 10 and socket portion 18 are properly aligned to be hitched together. This device 20 has a flat base portion 22 to which a spherical shaped hollow member 24 is joined. The hollow member is approximately the same size as ball 10 and is shown here as composed of steel strips which are capable of absorbing minor shocks which may be imposed in the course of the aligning and joining operation. The base acts not only as a support but contains the switches and part of the wiring which contribute toward the functioning of the signal device.

Beneath the base are three vertical flat aligned tongues 28, 29, 30 hinged connected to the bottom of base 22. If it is considered desirable to enlarge the target area of the outermost tongues, an ear 32 may be pivotally joined by a rivet 33 to tongue 28 and an ear 34 may be pivotally joined by a rivet 35 to tongue 30. Each tongue has a cam plate at its upper end such as the cam plate 36 fastened to tongue 29 in FIGURE 4.

The switches 40, 42 and 44 located in the base 22 are basically flexible blade switches which are each constructed of two blades 40a, 40b; 42a, 42b and 44a and 44b respectively. Each switch is closed when its two flexible blades are brought together in contact by its respective cam.

Each signal device is preferably self powered. In the preferred case here, two "D" size flashlight battery cells 50 are used. These are contained within a casing 52 joined to the base 22. Also contained in the electrical power circuit is a main power switch 60 which permits electric power to pass to each of said lights 64, 66 and 68 when their respective switches 40, 42 and 44 are closed. As shown in FIGURE 5 each pair of switches and lights, is independently actuable since each pair is joined in parallel across the power source.

As shown in FIGURES 1 and 2 the lights 64, 66 and 68 and the power switch 60 are mounted in a box 56 high on a support rod 54 joined to casing 52. This permits the vehicle operator to view the lights 64, 66 and 68 very easily.

In operation the signal device 10 is joined to the coupling member 16 by fastening the spherical member 24 within the socket portion 18 after the draught bars 15—15 have been raised to their proper height by a jack (not shown) or other suitable means. This places the rod 54 in an upright position with the box 56 oriented so that the lights 64, 66, and 68 are visible from the motor vehicle. In addition, base 22 is substantially horizontal with the tongues 28, 29, 30 suspended substantially vertically. The switch 60 is then closed to power the parallel electrical signal circuits by batteries 50.

Utilizing the rod 54 and box 56 as a guide a driver in the vehicle A maneuvers the vehicle until he believes the ball 10 is beneath the socket portion 18. Should he be correct the ball 10 will be engaging tongue 29 as shown in FIGURE 4, forcing the tongue upwardly so that cam plate 36 causes the blades 42a and 42b to contact and close switch 42 thus lighting the center light 66.

Should the driver be misaligned, for example, too far to his left, the ball 10 will engage tongue 30 or ear 34 (if this is extended) as the driver backs up. The tongue 30 has a cam (not shown) similar to 36 on tongue 29. Therefore, as the tongue 30 is tipped up by ball 10, switch 44 will be closed, thus actuating the light 68, which is oriented to the driver's left. This quickly indicates that the driver must maneuver to his right to be properly aligned.

Similarly, should the driver be too far to his right, the ball 10 will engage tongue 28 or ear 32 (if this is extended) as the driver backs up. The tongue 28 has a cam (not shown) similar to 36 on tongue 29. Therefore, as the tongue 28 is tipped up by ball 10, switch 40 will be closed thus actuating the light 64, which is oriented to the drivers right. This quickly indicates that the driver must maneuver to his left to be properly aligned.

After the driver has maneuvered his vehicle so that light 66 indicates he is essentially in the position shown in FIGURE 4, the hollow member 24 is removed from the socket portion 18 and the entire signal device 20 is removed. The vehicle and ball 10 may then be backed slightly, if necessary, and the socket member 18 may be lowered onto the ball 10 and fastened thereon.

It is to be understood that the above description and accompanying drawing are to be deemed primarily as illustrative of the preferred mode presently contemplated of carrying out the principles of the invention, and that the device described and illustrated may be modified or altered in its form, proportions, detail of construction and arrangement of parts without departing from the spirit and scope of the invention as defined in the appended claims.

What I claim and desire to secure by Letters Patent is:

1. A device for visually indicating the proper alignment between the ball portion of a trailer hitch on a motor vehicle and the socket portion of a coupling member joined to a trailer comprising:
   (a) A base member containing a plurality, in excess of two of normally open switches,
   (b) pivotal contact means for movement upwardly and toward said trailer connected to and suspended beneath said base member for independently actuating a predetermined one of said switches when said ball portion is in a predetermined relative position to said socket portion.
   (c) holding means joined to said base member and adapted to engage said socket portion, for holding said base portion beneath said socket portion,
   (d) a signal box containing a plurality of lights corresponding in number to the number of said plurality of switches, supported above and in spaced relation to said base member to be visible from said vehicle,
   (e) electrical conducting means joining each of said lights to one each of said switches to form a plurality of independent parallel normally open electrical circuits:
      (1) means joined to and across said plurality of circuits for supplying electric power to said circuits,
      (2) one of said circuits being closed upon the actuation of its switch by its contact means due to movement of said ball portion into its relative predetermined position,
   whereby the predeterminal position of said ball portion relative to said socket portion may be determined visually from said vehicle, by the one of said lights which is lit.

2. A device for visually indicating the proper alignment between the ball portion of a trailer hitch on a motor vehicle and the socket portion of a coupling member joined to a trailer comprising:
   (a) a base member containing three normally open switches,
   (b) contact means connected to and suspended beneath said base member for independently actuating a predetermined one of said switches when said ball portion is in a predetermined relative position to said socket portion,
   (c) holding means joined to said base member and adapted to engage said socket portion, for holding said base portion beneath said socket portion,
   (d) a signal box containing three lights, supported above and in spaced relation to said base member to be visible from said vehicle,
   (e) electrical conducting means joining each of said lights to one each of said switches for forming three normally open electrical circuits,
      (1) means joined to and across said three electrical circuits for supplying electric power to said circuits,
      (2) one of said circuits being closed upon the actuation of its switch by its contact means due to movement of said ball portion into its relative predetermined position,
   whereby the predetermined position of said ball portion relative to said socket portion may be determined visually from said vehicle, by the one of said lights which is lit, said contact means being three flat rectangular elements pivotally mounted beneath said base for pivotal movement upwardly and toward said trailer,
      (a) said elements being aligned side by side at right angles to the normal path of travel of said trailer.

3. A device for visually indicating the proper alignment between the ball portion of a trailer hitch on a motor vehicle and the socket portion of a coupling member joined to a trailer comprising:
   (a) a base member containing three normally open switches,
      (1) each switch having a contact member joined to and suspended beneath said base member for pivotal movement upwardly and toward said trailer,
         (A) said contact members being aligned side by side at right angles to the normal path of travel of said trailer,
         (B) each contact member having means attached thereto for actuating its related switch when said contact member is swung upwardly,
   (b) a holding member joined to and above said base adapted to fit engagingly within said socket portion and hold said base member beneath said socket portion,
   (c) a battery container containing at least one battery joined to said base member,
   (d) a signal box containing three lights,
      (1) each of said lights having a corresponding switch of said three switches joined thereto,
   (e) support means for maintaining said signal box in spaced relation to and above said base member to be visible from said vehicle,
   (f) electrical conducting means joining said at least one battery, said switches, and said lights to form a plurality of normally open circuits,
      (1) each of said circuits being closable upon the pivoting of a contact member upwardly by said ball portion to actuate its corresponding switch and corresponding one of said lights,
   whereby the position of said ball portion relative to said socket portion may be determined by which of said lights is lit.

4. A device for visually indicating the proper alignment between the ball portion of a trailer hitch on a motor vehicle and the socket portion of a coupling member joined to a trailer comprising:
   (a) a base member containing three normally open switches,
      (1) each switch having a thin flat contact element joined to and suspended beneath said base member for pivotal movement upwardly and toward said trailer,
         (A) said contact elements being aligned side by side at right angles to the normal path of travel of said trailer,
         (B) each contact element having means, attached thereto at the end joined to said base, for actuating its related switch when said contact element is swung upwardly, (b) a holding member composed of steel straps forming a substantially hollow spheroid, joined to and above said base and adapted to fit engagingly within said socket portion and hold said base member beneath said socket portion, (c) a battery container containing at least one battery joined to said base member, (d) a signal box containing three lights,
 (1) each of said lights having a corresponding switch of said three switches joined thereto, (e) rigid support means for maintaining said signal box in spaced relation to and above said base member to be visible from said vehicle, (f) electrical conducting means joining said at least one battery, said switches, and said lights to form a plurality of normally open independent parallel circuits,
 (1) each one of said circuits being closable upon the pivoting of a contact element upwardly by said ball portion to actuate its corresponding switch and corresponding one of said lights, whereby the position of said ball portion relative to said socket portion may be determined by which of said lights is lit.

5. A device as called for in claim 4 wherein each switch contains two flexible blades whose contact closes said switch and wherein said actuating means on each contact element is a cam plate for forcing said flexible blades into contact.

References Cited

UNITED STATES PATENTS 2,797,406  6/1957  Tanis et al. _____ 340—282

JOHN W. CALDWELL, *Primary Examiner.*

ALVIN H. WARING, *Assistant Examiner.*

U.S. Cl. X.R.

340—282; 307—10; 280—511